(12) United States Patent
Brazeau

(10) Patent No.: US 11,443,064 B2
(45) Date of Patent: Sep. 13, 2022

(54) VERIFIABLE REMOVAL OF ITEM OF CONFIDENTIAL INFORMATION FROM DATA OF A RECORD

(71) Applicant: salesforce.com, inc., San Francisco, CA (US)

(72) Inventor: Jeremiah David Brazeau, Hudson, NH (US)

(73) Assignee: Salesforce, Inc., San Francisco, CA (US)

( * ) Notice: Subject to any disclaimer, the term of this patent is extended or adjusted under 35 U.S.C. 154(b) by 539 days.

(21) Appl. No.: 16/656,781

(22) Filed: Oct. 18, 2019

(65) Prior Publication Data

US 2021/0117572 A1    Apr. 22, 2021

(51) Int. Cl.
*G06F 21/62* (2013.01)
*G06F 12/14* (2006.01)
*G06F 21/64* (2013.01)
*G06F 21/60* (2013.01)

(52) U.S. Cl.
CPC ...... *G06F 21/6254* (2013.01); *G06F 12/1408* (2013.01); *G06F 12/1425* (2013.01); *G06F 21/602* (2013.01); *G06F 21/64* (2013.01)

(58) Field of Classification Search
CPC ............. G06F 21/6254; G06F 21/6245; G06F 12/1408; G06F 12/1425; G06F 21/602; G06F 21/64; G06F 16/23; G06F 16/90335; G06F 16/9535; G06F 16/9577
See application file for complete search history.

(56) References Cited

U.S. PATENT DOCUMENTS

| | | | |
|---|---|---|---|
| 2003/0135480 A1* | 7/2003 | Van Arsdale | G06F 16/23 |
| 2004/0181670 A1* | 9/2004 | Thune | G06F 21/6263 713/176 |
| 2009/0319588 A1* | 12/2009 | Gandhi | G06F 16/21 |

FOREIGN PATENT DOCUMENTS

JP        2020077256 A  *  5/2020

* cited by examiner

*Primary Examiner* — Matthew T Henning
(74) *Attorney, Agent, or Firm* — Butzel Long; Donald J. Lecher

(57) ABSTRACT

A determination can be made that an item of confidential information has been removed from a record. A determination can be made that the record has the item of confidential information. The item of confidential information can be represented by an original value. A replacement value can be calculated. The replacement value can be a value of a transformation function applied to the original value. The replacement value can be testable for an existence of a digital signature, the digital signature to be derived from the replacement value. The record, in which the original value has been replaced by the replacement value can be used for a test. The test can be of a characteristic of an application. An ability to derive the digital signature from the replacement value can be an indication that the item of confidential information has been removed from the field.

22 Claims, 13 Drawing Sheets

| | 322 | 324 | 326 | 328 330 |
|---|---|---|---|---|
| 302 | Adams | Sam | 212-432-0123 | 9745-8400-1436-8582 | Y |
| 304 | Bond | James | 202-567-8734 | 7469-5600-2748-7493 | Y |
| 306 | Cho | John | 301-874-0256 | 4623-6700-3859-6852 | N |
| 308 | David | Larry | 703-569-0357 | 3527-6300-4729-1402 | Y |
| 310 | Evans | Bob | 720-257-9854 | 6834-7200-5830-2683 | Y |
| 312 | Frank | Anne | 312-435-8756 | 3573-5600-6382-5389 | Y |
| 314 | Gomez | Selena | 786-683-8732 | 4256-6300-8532-4278 | N |
| 316 | Ho | Don | 847-759-3526 | 8456-5600-4838-3628 | N |
| 318 | Icahn | Carl | 213-957-2598 | 2584-7200-6370-9305 | Y |
| 320 | Jack | Billy | 410-364-1475 | 1479-8400-9363-0439 | Y |

| | |
|---|---|
| 65-100-97-109-115 | 486 |
| 66-111-110-100 | 387 |
| 67-104-111 | 282 |
| 68-97-118-105-115 | 488 |
| 69-118-97-110-115 | 509 |
| 70-114-97-110-107 | 498 |
| 71-111-109-101-122 | 514 |
| 72-111 | 183 |
| 73-99-97-104-110 | 483 |
| 74-97-99-107 | 377 |

| 322 | 324 | 326 | 328 | 330 |
|---|---|---|---|---|
| Kiss | Bela | 312-753-1357 | 6715-9300-4163-9693 | Y |
| Lauren | Ralph | 212-680-7500 | 5641-7400-3972-5271 | Y |
| Mark | Marky | 786-582-3589 | 7956-4900-1031-8074 | N |
| Nieman | Marcus | 202-741-3680 | 5345-4500-6941-3624 | Y |
| Obama | Barack | 720-479-6579 | 5943-4600-3103-6027 | Y |
| Pelosi | Nancy | 301-354-7568 | 5751-8300-2746-8656 | Y |
| Quaid | Dennis | 847-916-6510 | 2546-5800-5382-2748 | N |
| Roper | Stanley | 703-597-5263 | 5729-6500-2011-7262 | N |
| Spice | Posh | 410-597-5289 | 2854-9700-6730-9035 | Y |
| Taylor | Liz | 720-708-3712 | 4825-5700-5717-2651 | Y |

| | |
|---|---|
| 75-105-115-115 | 410 |
| 76-97-117-114-101-110 | 615 |
| 77-97-114-107 | 395 |
| 78-101-105-109-97-110 | 600 |
| 79-98-97-109-97 | 480 |
| 80-101-108-111-115-105 | 620 |
| 81-117-97-105-100 | 500 |
| 82-111-112-101-114 | 520 |
| 83-112-105-99-101 | 500 |
| 84-97-121-108-111-114 | 635 |

1000

1002 — Copy each record, of a set of records, from a first set of memory cells to a second set of memory cells

1004 — Determine, for each record of the set of records, that a field, of the set of records, has a corresponding item of confidential information represented by a corresponding original value

1006 — Calculate, for each record in a first subset of the set of records, a corresponding replacement value as a corresponding value of a transformation function applied to the corresponding original value

1008 — Replace, for each record in the first subset of the set of records, the corresponding original value with the corresponding replacement value

1010 — Replace, for each record in a second subset of the set of records, the corresponding original value with a random value

1012 — Set the value of r so that $(\{n! / [r! \times (n-r)!]\} \times p^r)$ is less than or equal to a threshold, n being a sum of a number of records in the set of records, r being a sum of a number of the records in the first subset of records, p being a probability of a digital signature being derivable from original values of the field of the records of the set of records

FIG. 10

VERIFIABLE REMOVAL OF ITEM OF CONFIDENTIAL INFORMATION FROM DATA OF A RECORD

BACKGROUND

A database can be an organized collection of data that can be stored in memory cells and that can be accessed through memory control circuitry controlled by a processor. A database management system can be software that can be operated by the processor so that applications and end users can interact with the memory cells of the database. The database management system can be configured so that the data stored in the memory cells can mimic, in interactions with the applications and the end users, being organized into one or more tables. A table can be a collection of data in which a set of one or more specific types of data related to one or more entities can be arranged. A specific type of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 3 is a diagram illustrating an example of a set of records having original values, which represent items of confidential information

FIG. 6 is a diagram illustrating a field, of the set of records, in which original values, for the last names, are represented by a sequence of characters, which, in turn, are represented by a corresponding sequence of numbers in accordance with the American Standard Code for Information Exchange (ASCII).

FIG. 8 is a diagram illustrating an example of the set of records in which the original values, which represent the items of confidential information, have been replaced by replacement values.

FIG. 9 is a diagram illustrating the field, of the set of records, in which the replacement values, for the last names, are represented by a sequence of characters, which, in turn, are represented by a corresponding sequence of numbers in accordance with ASCII.

FIG. 10 is a flow diagram illustrating an example of a method for determining a number of records, in a set of records, to which a transformation function is applied to a value of a field, according to the disclosed technologies.

DETAILED DESCRIPTION

Figure 1:
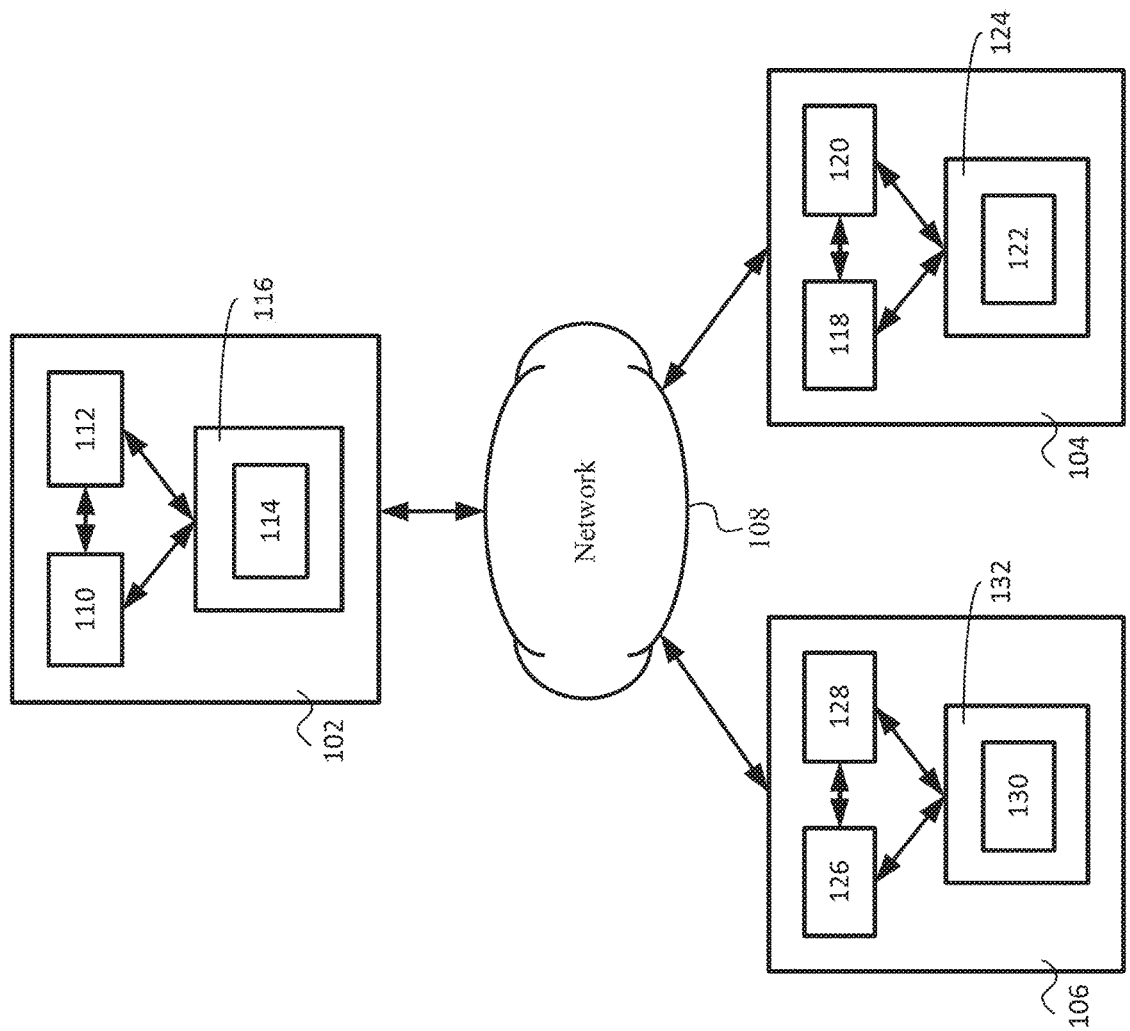
FIG. 1 is a diagram illustrating an example of an environment for determining that an item of confidential information has been removed from a record, according to the disclosed technologies.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A database can be an organized collection of data that can be stored in memory cells and that can be accessed through memory control circuitry controlled by a processor. A database management system can be software that can be operated by the processor so that applications and end users can interact with the memory cells of the database. The database management system can be configured so that the data stored in the memory cells can mimic, in interactions with the applications and the end users, being organized into one or more tables. A table can be a collection of data in which a set of one or more specific items of data related to one or more entities can be arranged. A specific item of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record. A database can be used by an organization to support a variety of activities including, for example, maintaining administrative information and managing workflow.

The development of the Internet has allowed for computing resources to be distributed so that, for example, data can be sent, via the Internet, from a first location to a second location. At the second location, computing resources can use the data to perform a function (using an application). A result of the function can be sent, via the Internet, from the second location to the first location. This, in turn, has led to the emergence of cloud computing in which an application, traditionally performed by computing resources of an organization (e.g., at the first location), can be performed by computing resources of a third party (e.g., at the second location). In this manner, the computing resources of such a third party cloud computing organization can be referred to as a production environment.

More recently, such third party cloud computing organizations have developed multitenancy software architecture so that a single instance of an application operating on a computing resource (e.g., a server) of a cloud computing organization can perform the function of the application for multiple client organizations (e.g., tenants). Multitenancy software architecture can be configured so that a first tenant generally does not have access to proprietary data of a second tenant, and vice versa.

A tenant may like to have a copy of some of the data transferred from the computing resources of the production environment to computing resources of a testing environment in order to test a characteristic of a particular application of interest to the tenant. The computing resources of the testing environment can be of: (1) the tenant, (2) the third party cloud computing organization, or (3) another third party. Often in this situation it can be desirable to remove confidential information, such as personally identifiable information, from the data before transferring the data to the computing resources of the testing environment. In a conventional process, such confidential information can be removed by replacing values of the data that represent the confidential information with random values. Often a production of such random values can be controlled so that the "random" values are perceptible, to a recipient of the "random" values, as authentic data. That is, the production of numbers associated with such "random" values can be controlled so that a sequence of characters, a sequence of numbers, or the like, represented by the "random" values, are: (1) perceptible, to a recipient of the "random" values as realistic names, telephone numbers, credit card numbers, or the like and (2) operable in the same manner as the original values in the particular application. Such conditions can be important to testing the characteristic of the particular application. Unfortunately, however, the use of "random" values that are perceptible as authentic data can inhibit an ability to confirm that confidential information has been removed from the data.

The disclosed technologies can provide techniques to replace confidential information in a record with data that fulfills the purpose of such "random" replacement data, but also allows for verification that the confidential information has been replaced and the data presently in the record are actually replacement information. The record can be copied from a first set of memory cells to a second set of memory cells. A determination can be made that a field, of the record, has the item of confidential information. The item of confidential information can be represented by an original value. Optionally, the value of the field can be replaced by an interim value. The interim value can be a random value. A replacement value can be calculated. The replacement value can be a value of a transformation function applied to the value of the field. The value of the field can be the original value or the interim value. The value of the field can be replaced with the replacement value. The replacement value can be testable for an existence of a digital signature, the digital signature to be derived from the replacement value. The record, in which, in the value of the field has been replaced with the replacement value can be used for a test. The test can be of a characteristic of an application. An ability to derive the digital signature from the replacement value can be an indication that the item of confidential information has been removed from the field.

FIG. 1 is a diagram illustrating an example of an environment 100 for determining that an item of confidential information has been removed from a record, according to the disclosed technologies. The environment 100 can include several elements such as, for example, computing resources 102 of a third party cloud computing organization, computing resources 104 of a tenant, and computing resources 106 of another third party. For example, the computing resources 106 of the other third party can be elements of a testing environment for testing a performance of an application. In an implementation, an element of environment 100 can be communicatively connected to one or more other elements via a network 108. The computing resources 102 of the third party cloud computing organization can include, for example, a processor 110, a first set of memory cells 112, and a second set of memory cells 114. The second set of memory cells 114 can be included, for example, in a sandbox 116. The computing resources 104 of the tenant can include, for example, a processor 118, a first set of memory cells 120, and a second set of memory cells 122. The second set of memory cells 122 can be included, for example, in a sandbox 124. The computing resources 106 of the other third party can include, for example, a processor 126, a first set of memory cells 128, and a second set of memory cells 130. The second set of memory cells 130 can be included, for example, in a sandbox 132. One or more of the sandbox 116, the sandbox 124, or the sandbox 132 can be, for example, an element of computing resources of the testing environment for testing the performance of the application. Such a sandbox can isolate the application and data transferred to the sandbox from computing resources of a production environment.

Figure 2A:
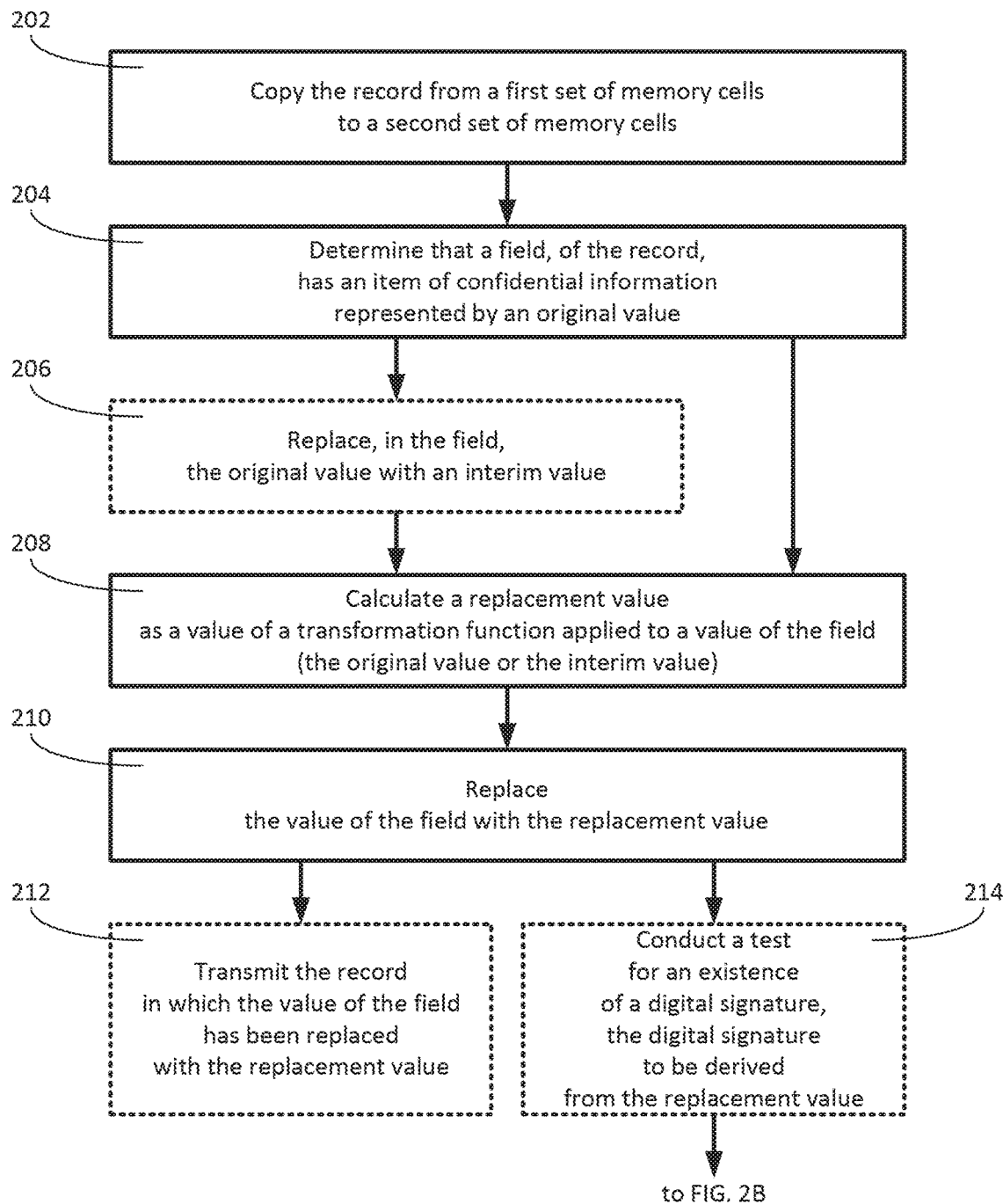
FIGS. 2A and 2B are a flow diagram illustrating an example of a first method for determining that an item of confidential information has been removed from a record, according to the disclosed technologies.
Figure 2B:
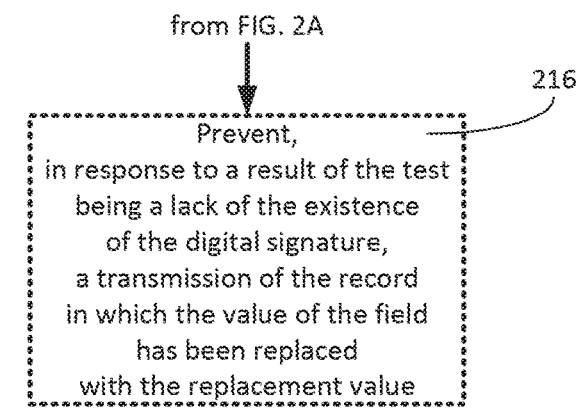

FIGS. 2A and 2B are a flow diagram illustrating an example of a first method 200 for determining that an item of confidential information has been removed from a record, according to the disclosed technologies.

FIG. 3 is a diagram illustrating an example of a set of records 300 having original values, which represent items of confidential information. For example, the set of records 300 can be of data collected by the tenant, but maintained by the third party cloud computing organization. For illustrative purposes herein, the set of records 300 can include records 302 through 320, a first field 322 for last names, a second field 324 for first names, a third field 326 for contact information (e.g., telephone numbers), a fourth field 328 for account numbers for accounts with one or more financial institutions (e.g., credit card numbers), and a fifth field 330 to indicate a status of membership in a loyalty program of the tenant.

With reference to FIG. 2A, in the method 200, at an operation 202, a processor can copy the record from a first set of memory cells to a second set of memory cells. The second set of memory cells can be included, for example, in a sandbox. With reference to FIG. 3, for example, the record can be the record 302. With reference to FIG. 1, for example, the processor can be the processor 110, the first set of memory cells can be the first set of memory cells 112, the second set of memory cells can be the second set of memory cells 114, and the sandbox can be the sandbox 116.

Returning to FIG. 2A, at an operation 204, the processor can determine that a field, of the record, has the item of confidential information. The item of confidential information can be represented by an original value. For example, the item of confidential information can include one or more of a name (e.g., a last name or a first name), a contact information (e.g., a telephone number), or an account number for an account with a financial institution (e.g., a credit card number). With reference to FIG. 3, for example, the field can be the field 322, the item of confidential information can be data in the field 322 of the record 302, and the original value can be the sequence of characters A-d-a-m-s.

Returning to FIG. 2A, in an implementation of the disclosed technologies, at an operation 206, the processor can replace, in the field, the original value with an interim value. The interim value can be a random value. Alternatively, a production of such a random value can be controlled so that: (1) the "random" value can facilitate a production of another value according to the disclosed technologies, (2) the "random" value can be perceptible, to a recipient of the "random" value, as authentic data, or (3) both. With reference to FIG. 3, for example, the original value in the field 322 of the record 302, the sequence of characters A-d-a-m-s, can be replaced with an interim value, the sequence of characters U-n-i-t-a-s.

Returning to FIG. 2A, at an operation 208, the processor can calculate a replacement value. The replacement value can be a value of a transformation function applied to a value of the field. The value of the field can be the original value or the interim value. (That is, in the implementation of the disclosed technologies in which, in the field, the original value has been replaced with the interim value, the transformation function can be applied to the interim value.) The replacement value can be testable for an existence of a digital signature, the digital signature to be derived from the replacement value. For example, the transformation function can be irreversible. For example, the replacement value can be perceptible, to a recipient of the replacement value, as authentic data.

For example, in an implementation of the disclosed technologies, if the replacement value includes a sequence of numbers, then the sequence of numbers can be a monotonic sequence of numbers.

For example, in an implementation of the disclosed technologies, the replacement value can conform to a specific format. For example, if the value of the field (i.e., the original value or the interim value) represents a credit card number, then the replacement value can be a sequence of sixteen numbers in four subsequences each of four numbers, each subsequence separated from an adjacent subsequence by a dash.

For example, in an implementation of the disclosed technologies: (1) the value of the field (i.e., the original value or the interim value) can be represented by a first sequence of characters, (2) the replacement value can be represented by a second sequence of characters, and (3) the transformation function can include one or more functions that cause the second sequence of characters to: (a) include a specific character (e.g., m), (b) start with a specific character (e.g., A), (c) include a specific subsequence of characters (e.g., if the second sequence of characters represents an address, then the specific subsequence S-t-r-e-e-t can be included in the second sequence of characters), or (d) exclude a specific subsequence of characters (e.g., if the second sequence of characters represents an address, then the specific subsequence R-o-a-d can be excluded from the second sequence of characters).

For example, in an implementation of the disclosed technologies: (1) the value of the field (i.e., the original value or the interim value) can be represented by a first sequence of characters (e.g., A-d-a-m-s or U-n-i-t-a-s) and (2) the replacement value can be represented by a second sequence of characters (e.g., K-i-s-s). A character, of each of the first sequence of characters and the second sequence of characters, can represented by a number in accordance with a character encoding standard. For example, the character encoding standard can be selected from the group consisting of: American Standard Code for Information Exchange (ASCII) and Unicode. A sum of numbers, in a sequence of numbers that corresponds to the second sequence of characters, can be divisible by a specific number. For example, the specific number can be a prime number. The specific number can be the digital signature.

For example, if: (1) the replacement value is represented by the second sequence of characters K-i-s-s; (2) characters, of the second sequence of characters, are represented by numbers in accordance with ASCII; and (3) the specific number is five, then: (1) the sequence of numbers that corresponds to the second sequence of characters is 75-105-115-115; (2) the sum of numbers, in the sequence of numbers, is 410; and (3) the sum of numbers (i.e., 410) divided by the specific number (i.e., 5) is 82. In this manner, the digital signature can be derived from the replacement value.

At an operation 210, the processor can replace the value of the field (i.e., the original value or the interim value) with the replacement value. With reference to FIG. 3, for example, the value (i.e., the original value or the interim value) of the field 322 of the record 302, the sequence of characters A-d-a-m-s or U-n-i-t-a-s, can be replaced with a replacement value, the sequence of characters K-i-s-s. The record, in which the value of the field (i.e., the original value or the interim value) has been replaced with the replacement value, can be used for a first test. The first test can be of a characteristic of an application. The characteristic of the application can include one or more of: (1) a performance of the application, (2) a functional behavior of the application, or (3) the like. With reference to FIG. 1, for example, the first test of the characteristic of the application can be performed by the computing resources 102 of the third party cloud computing organization. An ability to derive the digital signature from the replacement value can be an indication that the item of confidential information has been removed from the field.

Returning to FIG. 2A, alternatively or additionally, in an implementation of the disclosed technologies, at an operation 212, the processor can transmit, to another processor, the record, in which the value of the field (i.e., the original value or the interim value) has been replaced with the replacement value, to be used by the other processor to conduct the first test. The other processor can be a computing resource in a testing environment. With reference to FIG. 1, for example, the other processor can be: (1) the processor 112 of the computing resources 104 of the tenant, (2) the processor 126 of the computing resources 106 of the other third party, or (3) both.

Returning to FIG. 2A, additionally, in an implementation of the disclosed technologies, at an operation 214, the processor can conduct a second test. The second test can be of the replacement value for the existence of the digital signature.

With reference to FIG. 2B, in the method 200, additionally, in an implementation of the disclosed technologies, at an operation 216, the processor, in response to a result of the second test being a lack of the existence of the digital signature, can prevent a transmission of the record, in which the value of the first field has been replaced with the first replacement value, to another processor to conduct the first test.

Advantageously, preventing the transmission of the record, in which the value of the first field has been replaced with the first replacement value, to the other processor can save time, energy, and processing operations associated with the other processor (e.g., the processor 112 of the computing resources 104 of the tenant or the processor 126 of the computing resources 106 of the other third part) and elements of the network (e.g., the network 108).

Figure 4A:
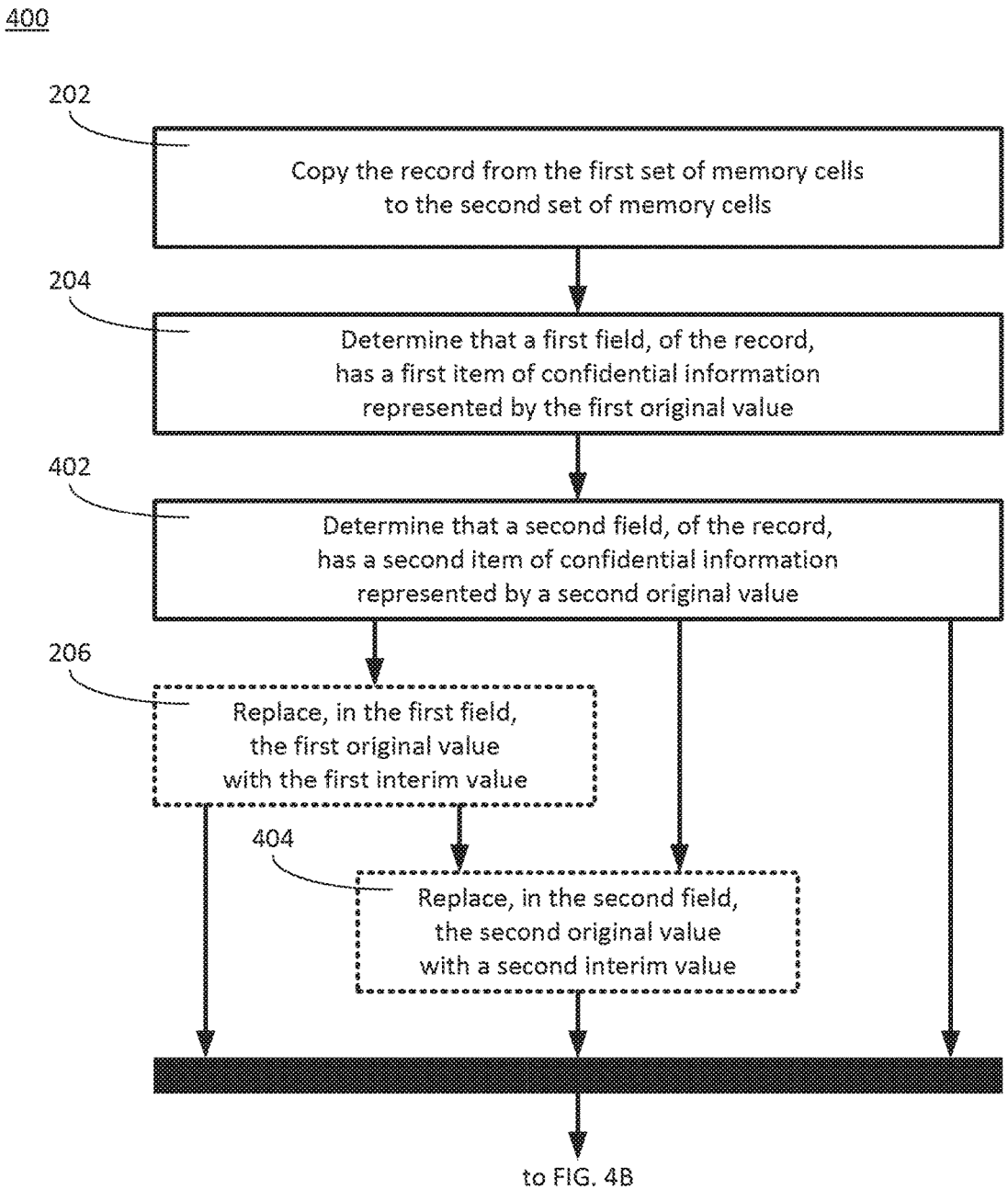
FIGS. 4A and 4B are a flow diagram illustrating an example of a second method for determining that the item of confidential information has been removed from the record, according to the disclosed technologies.
Figure 4B:
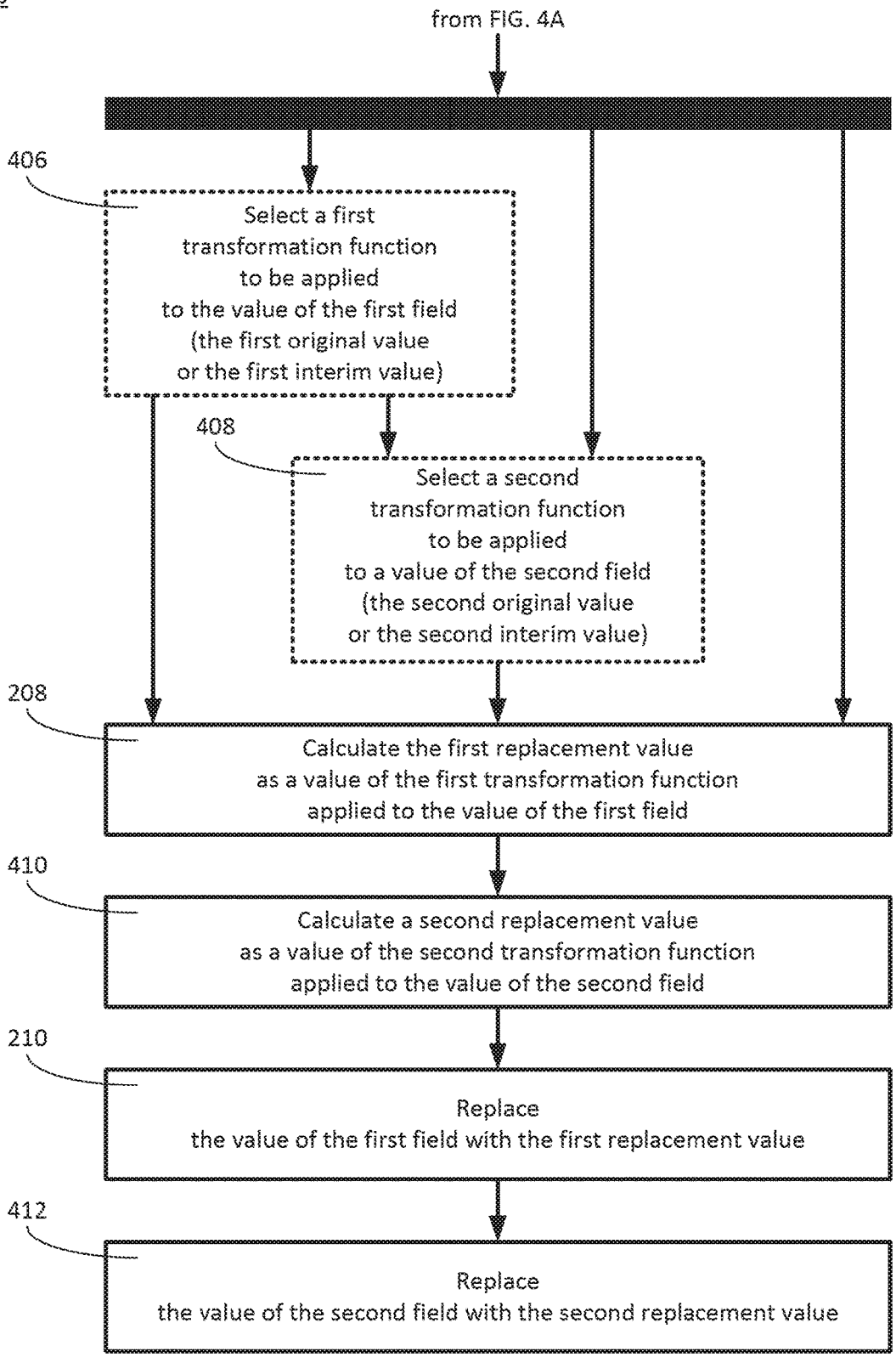

FIGS. 4A and 4B are a flow diagram illustrating an example of a second method 400 for determining that the item of confidential information has been removed from the record, according to the disclosed technologies.

In the method 400, at the operation 202, the processor can copy the record from the first set of memory cells to the second set of memory cells. The second set of memory cells can be included, for example, in the sandbox. With reference to FIG. 3, for example, the record can be the record 302. With reference to FIG. 1, for example, the processor can be the processor 110, the first set of memory cells can be the first set of memory cells 112, the second set of memory cells can be the second set of memory cells 114, and the sandbox can be the sandbox 116.

Returning to FIG. 4A, at the operation 204, the processor can determine that a first field, of the record, has a first item of confidential information. The first item of confidential information can be represented by the first original value. For example, the first item of confidential information can include one or more of a name (e.g., a last name or a first name), a contact information (e.g., a telephone number), or an account number for an account with a financial institution (e.g., a credit card number). With reference to FIG. 3, for example, the first field can be the field 322, the first item of confidential information can be data in the field 322 of the record 302, and the first original value can be the sequence of characters A-d-a-m-s.

Returning to FIG. 4A, at an operation 402, the processor can determine that a second field, of the record, has a second item of confidential information. The second item of confidential information can be represented by a second original value. For example, the second item of confidential information can include one or more of a name (e.g., a last name or a first name), a contact information (e.g., a telephone number), or an account number for an account with a financial institution (e.g., a credit card number). With reference to FIG. 3, for example, the second field can be the field 328, the second item of confidential information can be data in the field 328 of the record 302, and the second original value can be the sequence of numbers 9-7-4-5-8-4-0-0-1-4-3-6-8-5-8-2.

Returning to FIG. 4A, in an implementation of the disclosed technologies, at the operation 206, the processor can replace, in the first field, the first original value with the first interim value. The first interim value can be a random value. Alternatively, a production of such a random value can be controlled so that: (1) the "random" value can facilitate a production of another value according to the disclosed technologies, (2) the "random" value can be perceptible, to a recipient of the "random" value, as authentic data, or (3) both. With reference to FIG. 3, for example, the first original value in the field 322 of the record 302, the sequence of characters A-d-a-m-s, can be replaced with a first interim value, the sequence of characters U-n-i-t-a-s.

Returning to FIG. 4A, in an implementation of the disclosed technologies, at an operation 404, the processor can replace, in the second field, the second original value with a second interim value. The second interim value can be a random value. Alternatively, a production of such a random value can be controlled so that: (1) the "random" value can facilitate a production of another value according to the disclosed technologies, (2) the "random" value can be perceptible, to a recipient of the "random" value, as authentic data, or (3) both. With reference to FIG. 3, for example, the second original value in the field 328 of the record 302, the sequence of numbers 9-7-4-5-8-4-0-0-1-4-3-6-8-5-8-2, can be replaced with a second interim value, the sequence of numbers 0-9-7-9-3-6-0-0-2-6-6-9-7-8-5-1.

With reference to FIG. 4B, in the method 400, in an implementation of the disclosed technologies, at an operation 406, the processor can select a first transformation function, to be applied to the value of the first field (i.e., the first original value or the first interim value) to calculate the first replacement value, based on a result of an analysis of one or more of the value of the first field or a type of data of the first field. With reference to FIG. 3, for example, the type of data in the field 322 can be character data used to represent last names.

Returning to FIG. 4B, in an implementation of the disclosed technologies, at an operation 408, the processor can select a second transformation function, to be applied to a value of the second field (i.e., the second original value or the second interim value) to calculate a second replacement value, based on a result of an analysis of one or more of the value of the second file or a type of data of the second field. With reference to FIG. 3, for example, the type of data in the field 328 can be number data used to represent credit card numbers.

The second transformation function can be different from the first transformation function. For example, one of skill in the art knows that the Luhn algorithm can be used to ensure that an identification number, including a credit card number, entered into an interface is valid. An identification number produced using the Luhn algorithm can include a check digit, which can be used to ensure that the identification number, as a whole, is valid. For this reason, in the example described above, using the Luhn algorithm as the second transformation function may not be effective to be applied to the value of the second field (i.e., the second original value or the second interim value) to calculate the second replacement value because the check digit (i.e., the digital signature) derived from the second replacement value may also be derived from the value of the second field. In this manner, using the Luhn algorithm as the second transformation function may not be effective as an indication that the second item of confidential information has been removed from the second field. Moreover, the second transformation function can be different from the first transformation function because of idiosyncrasies in patterns associated with the value of the first field (i.e., the first original value or the first interim value), the value of the second field (i.e., the second original value or the second interim value), or both.

Returning to FIG. 4B, at the operation 208, the processor can calculate the first replacement value. The first replacement value can be a value of the first transformation function applied to the value of the first field. The value of the first field can be the first original value or the first interim value. (That is, in the implementation of the disclosed technologies in which, in the first field, the first original value has been replaced with the first interim value, the first transformation function can be applied to the first interim value.) The first replacement value can be testable for an existence of a first digital signature, the first digital signature to be derived from the first replacement value. For example, the first transformation function can be irreversible. For example, the first replacement value can be perceptible, to a recipient of the first replacement value, as authentic data.

For example, in an implementation of the disclosed technologies: (1) the value of the first field (i.e., the first original value or the first interim value) can be represented by the first sequence of characters (e.g., A-d-a-m-s or U-n-i-t-a-s) and (2) the first replacement value can be represented by the second sequence of characters (e.g., K-i-s-s). A character, of each of the first sequence of characters and the second sequence of characters, can represented by a number in accordance with a character encoding standard. For example, the character encoding standard can be selected from the group consisting of: American Standard Code for Information Exchange (ASCII) and Unicode. A sum of numbers, in a sequence of numbers that corresponds to the second sequence of characters, can be divisible by a first specific number. For example, the first specific number can be a first prime number. The first specific number can be the first digital signature.

For example, if: (1) the first replacement value is represented by the second sequence of characters K-i-s-s; (2) characters, of the second sequence of characters, are represented by numbers in accordance with ASCII; and (3) the first specific number is five, then: (1) the sequence of numbers that corresponds to the second sequence of characters is 75-105-115-115; (2) the sum of numbers, in the sequence of numbers, is 410; and (3) the sum of numbers (i.e., 410) divided by the specific number (i.e., 5) is 82. In this manner, the first digital signature can be derived from the first replacement value.

At an operation 410, the processor can calculate a second replacement value. The second replacement value can be a value of the second transformation function applied to the value of the second field. The value of the second field can be the second original value or the second interim value. (That is, in the implementation of the disclosed technologies in which, in the second field, the second original value has been replaced with the second interim value, the second transformation function can be applied to the second interim value.) The second replacement value can be testable for an existence of a second digital signature, the second digital signature to be derived from the second replacement value. For example, the second transformation function can be irreversible. For example, the second replacement value can be perceptible, to a recipient of the second replacement value, as authentic data.

For example, in an implementation of the disclosed technologies: (1) the value of the second field (i.e., the second original value or the second interim value) can be represented by a first sequence of numbers (e.g., 9-7-4-5-8-4-0-0-1-4-3-6-8-5-8-2 or 0-9-7-9-3-6-0-0-2-6-6-9-7-8-5-1) and (2) the second replacement value can be represented by a second sequence of numbers (e.g., 2-2-1-4-8-2-0-0-4-9-0-4-2-1-9-6). A sum of numbers, in the second sequence of numbers, can be divisible by a second specific number. For example, the specific number can be a second prime number. The second specific number can be the second digital signature.

The second prime number can be different from the first prime number. For example, if, due to an idiosyncrasy in patterns associated with the value of the second field (i.e., the second original value or the second interim value), a large percentage of values of the second field is divisible by the first prime number (i.e., 5), then the second prime number (i.e., 3) can be selected so that a smaller percentage of the values of the second field is divisible by the second prime number. In this manner, the second prime number is more effective than the first prime number as an indication that the second item of confidential information has been removed from the second field.

For example, if: (1) the second replacement value is represented by the second sequence of numbers 2-2-1-4-8-2-0-0-4-9-0-4-2-1-9-6; and (2) the second specific number is three, then (1) the sum of numbers, in the second sequence of numbers, is 54; and (2) the sum of numbers (i.e., 54) divided by the second specific number (i.e., 3) is 18. In this manner, the second digital signature can be derived from the second replacement value.

At the operation 210, the processor can replace the value of the first field (i.e., the first original value or the first interim value) with the first replacement value. With reference to FIG. 3, for example, the value (i.e., the first original value or the first interim value) of the field 322 of the record 302, the sequence of characters A-d-a-m-s or U-n-i-t-a-s, can be replaced with the first replacement value, the sequence of characters K-i-s-s. An ability to derive the first digital signature from the first replacement value can be an indication that the first item of confidential information has been removed from the first field.

Returning to FIG. 4B, at an operation 412, the processor can replace the value of the second field (i.e., the second original value or the second interim value) with the second replacement value. With reference to FIG. 3, for example, the value (i.e., the second original value or the second interim value) in the field 328 of the record 302, the sequence of numbers (e.g., 9-7-4-5-8-4-0-0-1-4-3-6-8-5-8-2 or 0-9-7-9-3-6-0-0-2-6-6-9-7-8-5-1, can be replaced with the second replacement value, the sequence of numbers 2-2-1-4-8-2-0-0-4-9-0-4-2-1-9-6. An ability to derive the second digital signature from the second replacement value can be an indication that the second item of confidential information has been removed from the second field.

The record in which: (1) the value of the first field (i.e., the first original value or the first interim value) has been replaced with the first replacement value and (2) the value of the second field (i.e., the second original value or the second interim value) has been replaced with the second replacement value can be used for a test of a characteristic of an application.

One or more methods can be used determine an effectiveness of a transformation function.

Figure 5:
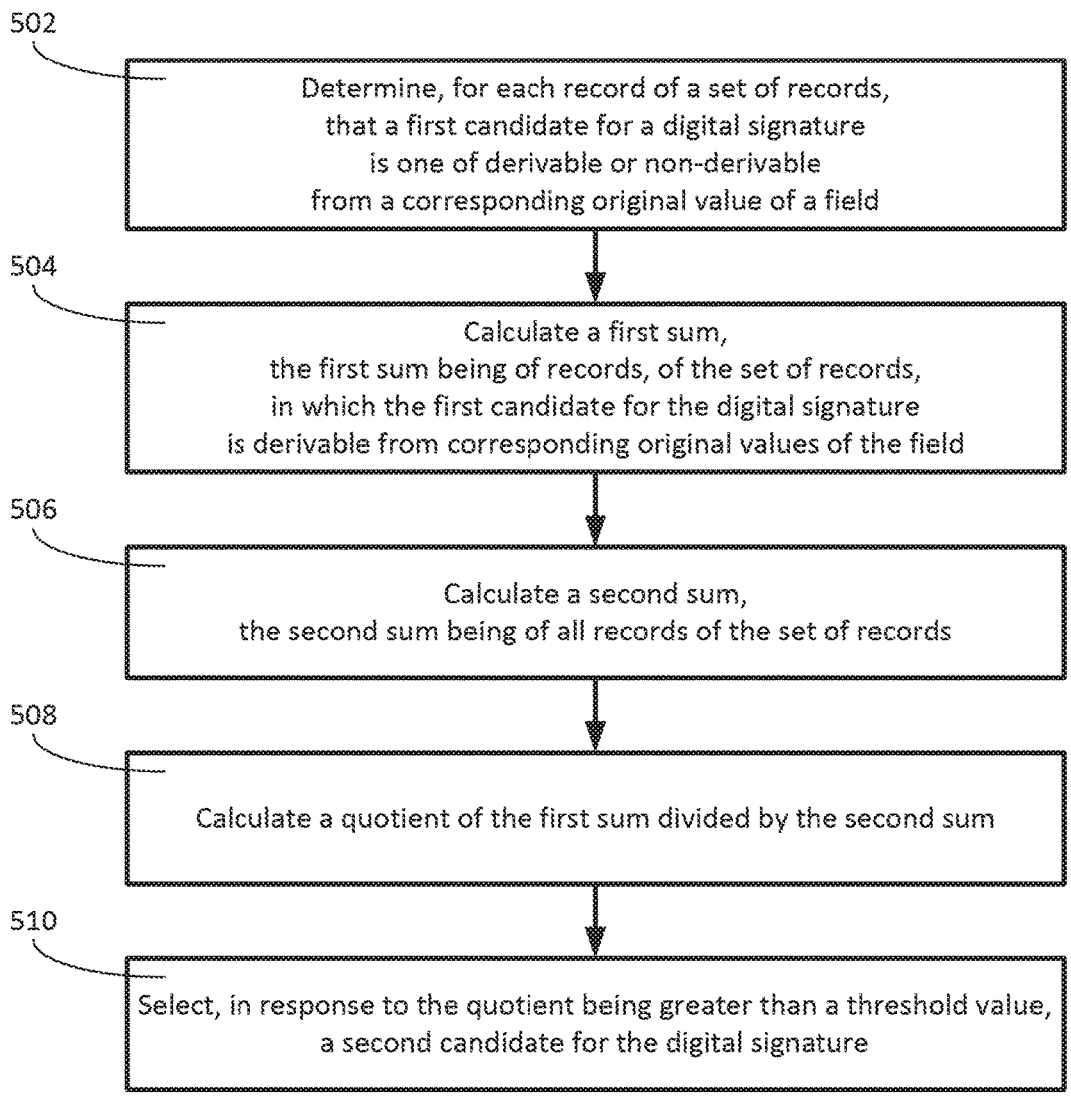
FIG. 5 is a flow diagram illustrating an example of a first method for determining an effectiveness of a transformation function, according to the disclosed technologies.

FIG. 5 is a flow diagram illustrating an example of a first method 500 for determining an effectiveness of a transformation function, according to the disclosed technologies.

FIG. 6 is a diagram 600 illustrating the first field 322, of the set of records 300, in which original values, for the last names, are represented by a sequence of characters, which, in turn, are represented by a corresponding sequence of numbers in accordance with the American Standard Code for Information Exchange (ASCII). The diagram 600 includes a column 602 which displays a sum of numbers in the corresponding sequence of numbers.

Returning to FIG. 5, in the method 500, at an operation 502, the processor can determine, for each record of the set of records, that a first candidate for a digital signature is one of derivable or non-derivable from a corresponding original value of the first field. The first candidate for the digital signature can be associated with a first candidate for a transformation function. With reference to FIG. 6, for example, if: (1) the first candidate for the transformation function is the sum of the numbers, in the corresponding sequence of numbers, divided by the first candidate for the digital signature and (2) the first candidate for the digital signature is three, then the first candidate for the digital signature is: (1) derivable from the original value in the first field 322 for the records 302, 304, 306, 312, 316, and 318 and (2) non-derivable from the original value in the first field 322 for the records 308, 310, 314, and 320.

Returning to FIG. 5, at an operation 504, the processor can calculate a first sum. The first sum can be of records, of the set of records, in which the first candidate for the digital signature is derivable from corresponding original values of the first field. With reference to FIG. 6, for example, the first sum can be of the records 302, 304, 306, 312, 316, and 318: six.

Returning to FIG. 5, at an operation 506, the processor can calculate a second sum. The second sum can be of all records of the set of records. With reference to FIG. 6, for example, the second sum can be of the records 302, 304, 306, 308, 310, 312, 314, 316, 318, and 320: ten.

Returning to FIG. 5, at an operation 508, the processor can calculate a quotient of the first sum divided by the second sum. For example, if the first sum is six and the second sum is ten, then the quotient can be 0.6.

At an operation 510, in response to the quotient being greater than a threshold value, the processor can select a second candidate for the digital signature. The second candidate for the digital signature can be associated with a second candidate for the transformation function. For example, if the quotient is 0.6 and the threshold value is 0.5, then the processor can select the second candidate for the digital signature. That is, because a large percentage (i.e., 60 percent) of the original values in the first field is divisible by the first candidate for the digital signature (i.e., 3), the first candidate for the digital signature may not be effective as an indication that items of confidential information have been removed from the first field.

Figure 7:
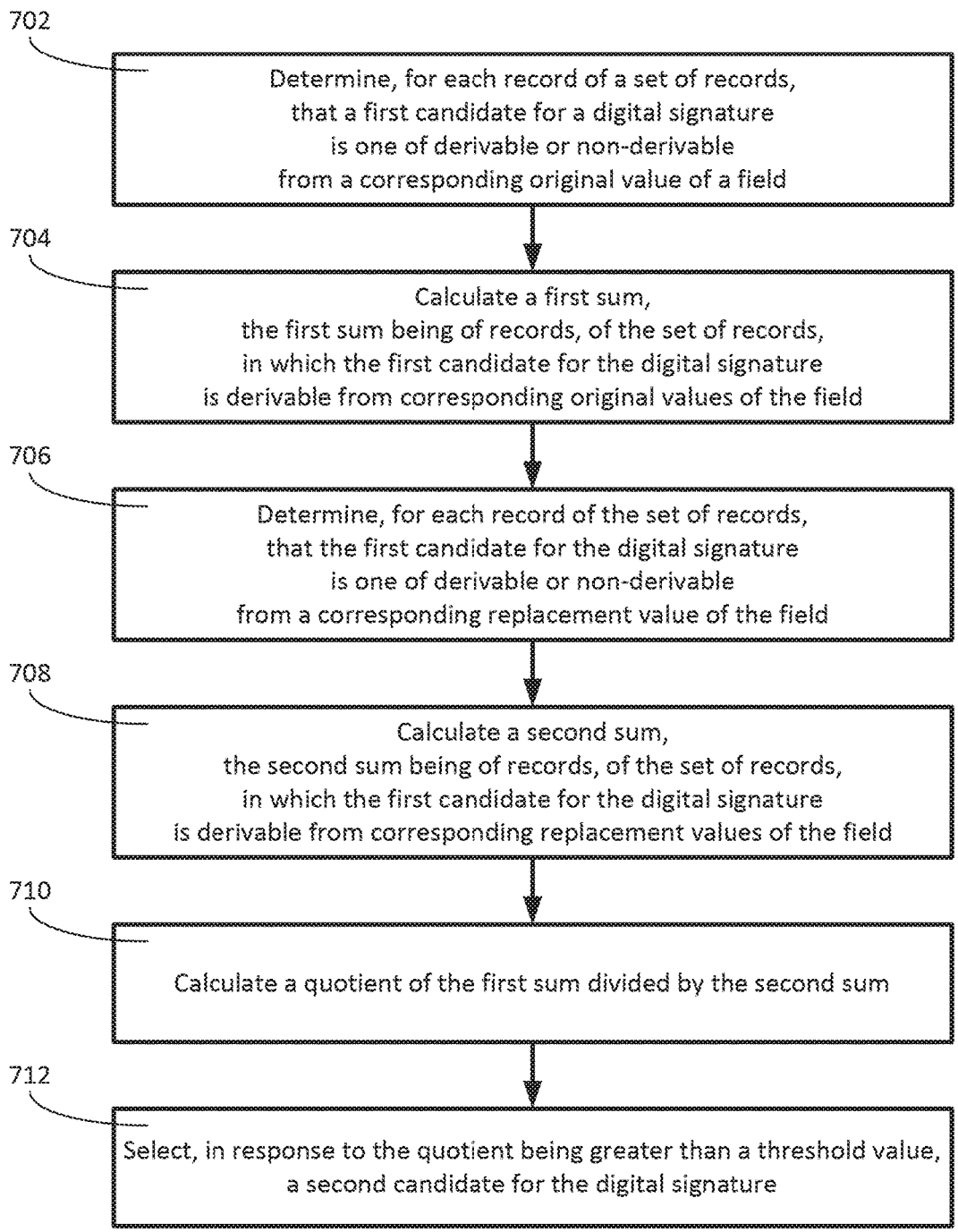
FIG. 7 is a flow diagram illustrating an example of a second method for determining the effectiveness of the transformation function, according to the disclosed technologies.

FIG. 7 is a flow diagram illustrating an example of a second method 700 for determining the effectiveness of the transformation function, according to the disclosed technologies.

FIG. 8 is a diagram illustrating an example of the set of records 300 in which the original values, which represent the items of confidential information, have been replaced by replacement values.

FIG. 9 is a diagram 900 illustrating the first field 322, of the set of records 300, in which the replacement values, for the last names, are represented by a sequence of characters, which, in turn, are represented by a corresponding sequence of numbers in accordance with the American Standard Code for Information Exchange (ASCII). The diagram 900 includes a column 902 which displays a sum of numbers in the corresponding sequence of numbers.

Returning to FIG. 7, in the method 700, at an operation 702, the processor can determine, for each record in the set of records, that a first candidate for a digital signature is one of derivable or non-derivable from a corresponding original value of the first field. The first candidate for the digital signature can be associated with a first candidate for a transformation function. With reference to FIG. 6, for example, if: (1) the first candidate for the transformation function is the sum of the numbers, in the corresponding sequence of numbers, divided by the first candidate for the digital signature and (2) the first candidate for the digital signature is five, then the first candidate for the digital signature is non-derivable from the original value in the first field 322 for the records 302, 304, 306, 308, 310, 312, 314, 316, 318, and 320.

Returning to FIG. 7, at an operation 704, the processor can calculate a first sum. The first sum can be of records, of the set of records, in which the first candidate for the digital signature is derivable from corresponding original values of the first field. With reference to FIG. 6, for example, the first sum can be: zero.

Returning to FIG. 7, at an operation 706, the processor can determine, for each record in the set of records, that the first candidate for the digital signature is one of derivable or non-derivable from a corresponding replacement value of the first field. With reference to FIG. 9, for example, if: (1) the first candidate for the transformation function is the sum of the numbers, in the corresponding sequence of numbers, divided by the first candidate for the digital signature and (2) the first candidate for the digital signature is five, then the first candidate for the digital signature is derivable from the replacement value in the first field 322 for the records 302, 304, 306, 308, 310, 312, 314, 316, 318, and 320.

Returning to FIG. 7, at an operation 708, the processor can calculate a second sum. The second sum can be of records, of the set of records, in which the first candidate for the digital signature is derivable from corresponding replacement values of the first field. With reference to FIG. 9, for example, the second sum can be of the records 302, 304, 306, 308, 310, 312, 314, 316, 318, and 320: ten.

Returning to FIG. 7, at an operation 710, the processor can calculate a quotient of the first sum divided by the second sum. For example, if the first sum is zero and the second sum is ten, then the quotient can be 0.0.

At an operation 712, in response to the quotient being greater than a threshold value, the processor can select a second candidate for the digital signature. The second candidate for the digital signature can be associated with a second candidate for the transformation function. For example, if the quotient is 0.0 and the threshold value is 0.15, then the processor may not select the second candidate for the digital signature. That is, because: (1) a small percentage (i.e., 0 percent) of the original values in the first field is divisible by the first candidate for the digital signature (i.e., 5) while (2) a large percentage (i.e., 100 percent) of the replacement values in the first field is divisible by the first candidate for the digital signature (i.e., 5), the first candidate for the digital signature can be effective as an indication that items of confidential information have been removed from the first field.

FIG. 10 is a flow diagram illustrating an example of a method 1000 for determining a number of records, in a set of records, to which a transformation function is applied to a value of a field, according to the disclosed technologies. A first number can be equal to a sum of a number of records in the set of records. For example, with reference to FIG. 3, for illustrative purposes herein, the first number can be equal to the sum of the number of the records in the set of records 300: ten. A second number can be equal to a sum of a number of the records in a first subset of the set of records. A second subset of the set of records and the first subset can be mutually exclusive. For illustrative purposes herein, the second number can be two.

With reference to FIG. 10, in the method 1000, at an operation 1002, the processor can copy each record, of the set of records, from a first set of memory cells to a second set of memory cells.

At an operation 1004, the processor can determine, for each record of the set of records, that a field, of the set of records, has a corresponding item of confidential information. The corresponding confidential information can be represented by a corresponding original value.

At an operation 1006, the processor can calculate, for each record in the first subset of the set of records, a corresponding replacement value. The corresponding replacement value can be a corresponding value of a transformation function applied to the corresponding original value. The corresponding replacement value can be testable for an existence of a digital signature. The digital signature to be derived from the corresponding replacement value.

At an operation 1008, the processor can replace, for each record in the first subset of the set of records, the corresponding original value with the corresponding replacement value.

At an operation 1010, the processor can replace, for each record in the second subset of the set of records, the corresponding original value with a random value. The second subset and the first subset can be mutually exclusive.

Additionally, a third number can be equal to a probability of a digital signature being derivable from original values of fields of the records of the set of records. A fourth number can be equal to a product of a fifth number multiplied by a sixth number. The fifth number can be equal to the third number raised to a power. The power can be the second number. The sixth number can be equal to a quotient of a seventh number divided by an eighth number. The seventh number can be equal to a factorial of the first number. The eighth number can be equal to a product of a ninth number multiplied by a tenth number. The ninth number can be equal to a factorial of the second number. The tenth number can be equal to a factorial of an eleventh number. The eleventh number can be equal to a difference of the second number subtracted from the first number.

That is, if the first number is n, the second number is r, and the third number is p, then the fourth number can be equal to: $(\{n!/[r! \times (n-r)!]\} \times p^r)$.

Additionally, in an implementation of the disclosed technologies, at an operation 1012, the processor set the second number to be less than or equal to a threshold. For example, the threshold can be the third number. Alternatively, the threshold can be a different number.

For example: (1) with reference to FIG. 3, the field can be the field 322, (2) each original value can be a corresponding sequence of characters, (3) with reference to FIG. 6, a character, of the sequence of characters, can be represented by a number in accordance with ASCII, and (4) the digital signature can be a specific number by which, for each record, a corresponding sum of the sequence of numbers is divisible.

For example, if the specific number is four, then, because only the sum of the sequence of numbers for the record 308 (i.e., 488) is divisible by the specific number (i.e., 4), the probability of the digital signature being derivable from the original values of the fields of the records of the set of records can be 0.1 (i.e., only one record of the set of ten records). Alternatively, the probability of the digital signature being derivable from the original values of the fields of the records of the set of records can be determined in another manner.

For example, if: (1) the first number (n) is 10, the second number (r) is 2, and the third number (p) is 0.1, then the fourth number can be 0.45.

However, if the threshold is the third number (p), 0.1, and the fourth number is 0.45, then the second number (r), 2, may be set too low. That is, the number of records in the first subset of the set of records, the records for which replacement values are calculated as values of the transformation function applied to original values, may be too low to ensure that the probability of the digital signature being derivable from the replacement values of the fields of the records of the set of records (i.e., both: (1) the replacement values that are calculated as values of the transformation function applied to the original values and (2) the replacement values that are random values) can be sufficiently low (e.g., less than or equal to the third number (p), 0.1).

In this case, the second number (r) can be set to a higher value. For example, if: (1) the first number (n) is 10, the second number (r) is 4, and the third number (p) is 0.1, then the fourth number can be 0.021. So, if the threshold is the third number (p), 0.1, and the fourth number is 0.021, then the second number (r), 4, may be set sufficiently high to ensure that the probability of the digital signature being derivable from the replacement values of the fields of the records of the set of records (i.e., both: (1) the replacement values that are calculated as values of the transformation function applied to the original values and (2) the replacement values that are random values) can be sufficiently low (e.g., less than or equal to the third number (p), 0.1).

In light of the technologies described above, one of skill in the art understands that operations to determine that an item of confidential information has been removed from a record can be performed using any combination of some or all of the foregoing configurations.

Figure 11:
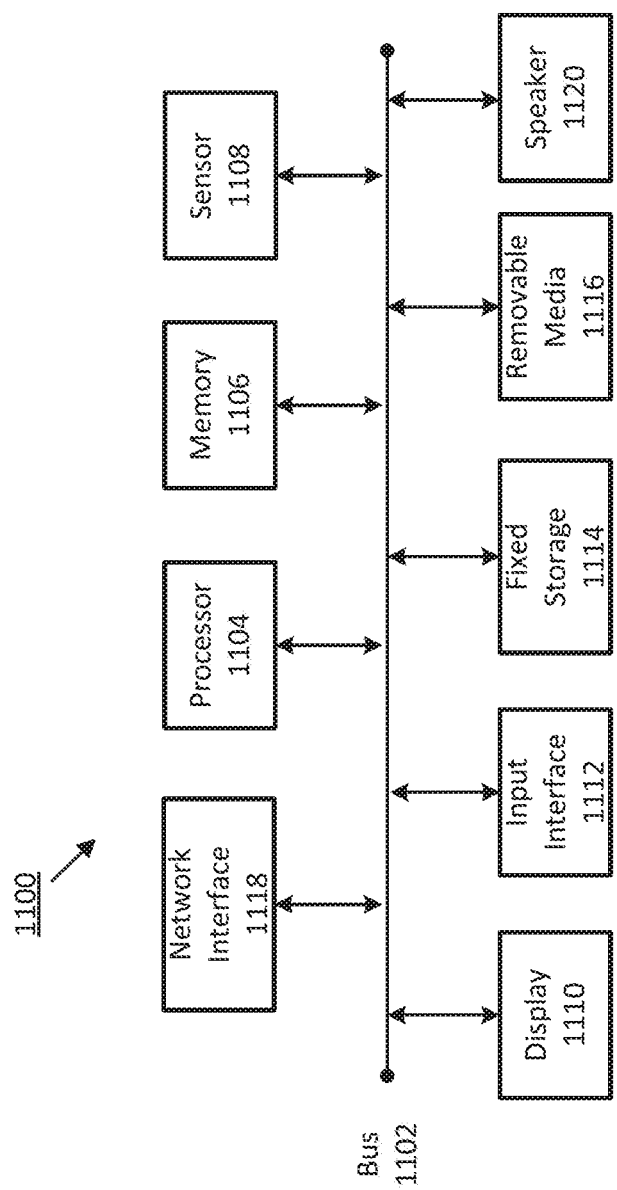
FIG. 11 is a block diagram of an example of a computing device suitable for implementing certain devices, according to the disclosed technologies.

FIG. 11 is a block diagram of an example of a computing device 1100 suitable for implementing certain devices, according to the disclosed technologies including, for example, one or more of the computing resources 102, the computing resources 104, or the computing resources 106. The computing device 1100 can be constructed as a custom-designed device or can be, for example, a special-purpose desktop computer, laptop computer, or mobile computing device such as a smart phone, tablet, personal data assistant, wearable technology, or the like.

The computing device 1100 can include a bus 1102 that interconnects major components of the computing device 1100. Such components can include a central processor 1104, a memory 1106 (such as Random Access Memory (RAM), Read-Only Memory (ROM), flash RAM, or the like), a sensor 1108 (which can include one or more sensors), a display 1110 (such as a display screen), an input interface 1112 (which can include one or more input devices such as a keyboard, mouse, keypad, touch pad, turn-wheel, and the like), a fixed storage 1114 (such as a hard drive, flash storage, and the like), a removable media component 1116 (operable to control and receive a solid-state memory device, an optical disk, a flash drive, and the like), a network interface 1118 (operable to communicate with one or more remote devices via a suitable network connection), and a speaker 1120 (to output an audible communication). In some embodiments the input interface 1112 and the display 1110 can be combined, such as in the form of a touch screen.

The bus 1102 can allow data communication between the central processor 1104 and one or more memory components 1114, 1116, which can include RAM, ROM, or other memory. Applications resident with the computing device 1100 generally can be stored on and accessed via a computer readable storage medium.

The fixed storage 1114 can be integral with the computing device 1100 or can be separate and accessed through other interfaces. The network interface 1118 can provide a direct connection to the premises management system and/or a remote server via a wired or wireless connection. The network interface 1118 can provide such connection using any suitable technique and protocol, including digital cellular telephone, WiFi™, Thread®, Bluetooth®, near field communications (NFC), and the like. For example, the network interface 1118 can allow the computing device 1100 to communicate with other components of the premises management system or other computers via one or more local, wide-area, or other communication networks.

The foregoing description, for purpose of explanation, has been described with reference to specific configurations. However, the illustrative descriptions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

The invention claimed is:

1. A method for determining that an item of confidential information has been removed from a record, the method comprising:
   copying, by a first processor, the record from a first set of memory cells to a second set of memory cells;
   determining, by the first processor, that a first field, of the record, has a first item of confidential information, the first item of confidential information represented by a first original value;
   calculating, by the first processor, a first replacement value, the first replacement value being a value of a first transformation function applied to a value of the first field, the value of the first field being the first original value or a first interim value, the first replacement value being testable for an existence of a first digital signature, the first digital signature to be derived from the first replacement value; and
   replacing, by the first processor, the value of the first field with the first replacement value,
   wherein the record, in which the value of the first field has been replaced with the first replacement value, is to be used for a first test, the first test being of a characteristic of an application, and
   wherein an ability to derive the first digital signature from the first replacement value is an indication that the first item of confidential information has been removed from the first field.

2. The method of claim 1, wherein the first item of confidential information includes at least one of a name, a contact information, or an account number for an account with a financial institution.

3. The method of claim 1, wherein the characteristic of the application comprises at least one of a performance of the application or a functional behavior of the application.

4. The method of claim 1, further comprising, before a calculation of the first replacement value, replacing, by the first processor and in the first field, the first original value with the first interim value, the first interim value being a random value.

5. The method of claim 1, further comprising transmitting, from the first processor and to a second processor, the record, in which the value of the first field has been replaced with the first replacement value, the second processor to conduct the first test.

6. The method of claim 5, wherein the second processor is a computing resource in a testing environment.

7. The method of claim 1, further comprising conducting, by the first processor, a second test, the second test being of the first replacement value for the existence of the first digital signature.

8. The method of claim 7, further comprising preventing, by the first processor and in response to a result of the second test being a lack of the existence of the first digital signature, a transmission of the record, in which the value of the first field has been replaced with the first replacement value, to a second processor to conduct the first test.

9. The method of claim 1, wherein the first replacement value:
   includes a monotonic sequence of numbers, or
   conforms to a specific format.

10. The method of claim 1, wherein:
    the first original value represents a first sequence of characters,
    the first replacement value represents a second sequence of characters, and
    the first transformation function comprises at least one of a function that causes the second sequence of characters to:
      include a specific character,
      start with the specific character,
      include a specific subsequence of characters, or
      exclude the specific subsequence of characters.

11. The method of claim 1, wherein:
    the first original value represents a first sequence of characters,
    the first replacement value represents a second sequence of characters,
    a character, of each of the first sequence of characters and the second sequence of characters, is represented by a number in accordance with a character encoding standard,
    a sum of numbers, in a sequence of numbers that corresponds to the second sequence of characters, is divisible by a specific number, and
    the specific number is the first digital signature.

12. The method of claim 11, wherein the character encoding standard is selected from the group consisting of: American Standard Code for Information Exchange (ASCII) and Unicode.

13. The method of claim 1:
    wherein:
      the record is included in a set of records,
      the copying and the determining are performed for each record in the set of records,
      a first number is equal to a sum of a number of records in the set of records,
      the calculating and the replacing are performed for each record in a first subset of the set of records, and
      a second number is equal to a sum of a number of the records in the first subset of the set of records, and
    further comprising replacing, by the first processor and for each record in a second subset of the set of records, a corresponding value of the first field with a random value, the second subset and the first subset being mutually exclusive.

14. The method of claim 13:
    wherein:
      a third number is equal to a probability of the first digital signature being derivable from original values of first fields of the records of the set of records,
      a fourth number is equal to a product of a fifth number multiplied by a sixth number,
      the fifth number is equal to the third number raised to a power, the power being the second number,
      the sixth number is equal to a quotient of a seventh number divided by an eighth number,
      the seventh number is equal to a factorial of the first number,
      the eighth number is equal to a product of a ninth number multiplied by a tenth number,
      the ninth number is equal to a factorial of the second number,
      the tenth number is equal to a factorial of an eleventh number, and
      the eleventh number is equal to a difference of the second number subtracted from the first number, and
    further comprising setting the second number so that the fourth number is less than or equal to a threshold.

15. The method of claim 14, wherein the threshold is the third number.

16. The method of claim 1, further comprising:
  determining, by the first processor, that a second field, of the record, has a second item of confidential information, the second item of confidential information represented by a second original value;
  calculating, by the first processor, a second replacement value, the second replacement value being a value of a second transformation function applied to a value of the second field, the value of the second field being the second original value or a second interim value, the second replacement value being testable for an existence of a second digital signature, the second digital signature to be derived from the second replacement value; and
  replacing, by the first processor, the value of the second field with the second replacement value,
  wherein the record, in which the value of the second field has been replaced with the second replacement value, is to be used for the first test, and
  wherein an ability to derive the second digital signature from the second replacement value is an indication that the second item of confidential information has been removed from the second field.

17. The method of claim 16, further comprising, before a calculation of the second replacement value, replacing, by the first processor and in the second field, the second original value with the second interim value, the second interim value being a random value.

18. The method of claim 16, further comprising:
  selecting, by the first processor, the first transformation function based on a result of an analysis of at least one of the value of the first field or a type of data of the first field; and
  selecting, by the first processor, the second transformation function based on a result of an analysis of at least one of the value of the second field or a type of data of the second field.

19. The method of claim 1, wherein the record is included in a set of records, the set of records having items of confidential information to be removed, and further comprising:
  determining, by the first processor and for each record of the set of records, that a second digital signature is one of derivable or non-derivable from a corresponding first original value of the first field, the second digital signature associated with a second transformation function;
  calculating, by the first processor, a first sum, the first sum being of records, of the set of records, in which the second digital signature is derivable from corresponding first original values of the first field;
  calculating, by the first processor, a second sum, the second sum being of all records of the set of records;
  calculating, by the first processor, a quotient of the first sum divided by the second sum; and
  selecting, by the first processor and in response to the quotient being greater than a threshold value, the first transformation function.

20. The method of claim 1, wherein the record is included in a set of records, the set of records having items of confidential information to be removed, and further comprising:
  determining, by the first processor and for each record in the set of records, that the first digital signature is one of derivable or non-derivable from a corresponding first original value of the first field;
  calculating, by the first processor, a first sum, the first sum being of records, of the set of records, in which the first digital signature is derivable from corresponding first original values of the first field;
  determining, by the first processor and for the each record in the set of records, that the first digital signature is one of derivable or non-derivable from a corresponding second original value of the first field;
  calculating, by the first processor, a second sum, the second sum being of records, of the set of records, in which the first digital signature is derivable from corresponding second original values of the first field;
  calculating, by the first processor, a quotient of the first sum divided by the second sum; and
  selecting, by the first processor and in response to the quotient being greater than a threshold value, a second transformation function, the second transformation function formed to produce a second digital signature.

21. A non-transitory computer-readable medium storing computer code for determining that an item of confidential information has been removed from a record, the computer code including instructions to cause a processor to:
  copy the record from a first set of memory cells to a second set of memory cells;
  determine that a field, of the record, has the item of confidential information, the item of confidential information represented by an original value;
  calculate a replacement value, the replacement value being a value of a transformation function applied to a value of the field, the value of the field being the original value or an interim value, the replacement value being testable for an existence of a digital signature, the digital signature to be derived from the replacement value; and
  replace the value of the field with the replacement value,
  wherein the record, in which the value of the field has been replaced with the replacement value, is to be used for a test, the test being of a characteristic of an application, and
  wherein an ability to derive the digital signature from the replacement value is an indication that the item of confidential information has been removed from the field.

22. A system for determining that an item of confidential information has been removed from a record, the system comprising:
  a memory configured to store the record; and
  a processor configured to:
    copy the record from a first set of memory cells to a second set of memory cells;
    determine that a field, of the record, has the item of confidential information, the item of confidential information represented by an original value;
    calculate a replacement value, the replacement value being a value of a transformation function applied to a value of the field, the value of the field being the original value or an interim value, a digital signature derivable from the replacement value; and
    replace the value of the field with the replacement value,
    wherein the record, in which the value of the field has been replaced with the replacement value, is to be used for a test, the test being of a characteristic of an application, and wherein an ability to derive the digital signature from the replacement value is an indication that the item of confidential information has been removed from the field.

* * * * *